United States Patent
Tsutsumi et al.

[11] Patent Number: 5,998,065
[45] Date of Patent: Dec. 7, 1999

[54] ION-CONDUCTOR FOR LITHIUM SECONDARY BATTERY AND LITHIUM SECONDARY BATTERY USING THE SAME

[75] Inventors: Masami Tsutsumi; Hiroshi Horiuchi; Tsutomu Miyashita, all of Kawasaki; Masaki Yoshio, Saga; Hideya Yoshitake, Tokyo, all of Japan

[73] Assignees: Fujitsu Limited, Kawasaki; Ube Industries, Ltd., Ube, both of Japan

[21] Appl. No.: 09/015,308

[22] Filed: Jan. 29, 1998

[30] Foreign Application Priority Data

Mar. 18, 1997 [JP] Japan .................................. 9-065101

[51] Int. Cl.$^6$ ..................................................... H01M 6/24
[52] U.S. Cl. ........................... 429/328; 429/326; 429/327
[58] Field of Search ..................... 429/189, 326, 429/327, 328

[56] References Cited

U.S. PATENT DOCUMENTS

| | | | |
|---|---|---|---|
| 4,301,220 | 11/1981 | Evans et al. | 429/197 |
| 4,670,363 | 6/1987 | Whitney et al. | 429/196 |
| 5,626,981 | 5/1997 | Simon et al. | 429/105 |
| 5,753,389 | 5/1998 | Gan et al. | 429/197 |

FOREIGN PATENT DOCUMENTS

| | | | |
|---|---|---|---|
| 2-148665 | 6/1990 | Japan | H01M 10/40 |
| 4-171674 | 6/1992 | Japan | |

*Primary Examiner*—Maria Nuzzolillo
*Assistant Examiner*—Mark Ruthkosky
*Attorney, Agent, or Firm*—Armstrong, Westerman, Hattori, McLeland & Naughton

[57] ABSTRACT

An ion-conductor for a lithium secondary battery comprising at least an electrolyte and an additive;

wherein the additive contains at least one kind of imido compound selected from the group consisting of compounds of the general formula (I):

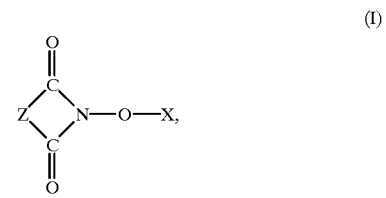

wherein Z is an optionally substituted alkylene group having 2 to 7 carbon atoms represented by the formula —$(CH_2)_n$— (n is an integer from 2 to 7), an optionally substituted 1,2-cyclohexylene group or an optionally substituted 1,2-phenylene group; and X is a hydrogen atom, an optionally substituted alkyl group, or an optionally substituted aralkylcarbonyl group.

15 Claims, 6 Drawing Sheets

ION-CONDUCTOR FOR LITHIUM SECONDARY BATTERY AND LITHIUM SECONDARY BATTERY USING THE SAME

CROSS-REFERENCE TO RELATED APPLICATIONS

This application is related to Japanese application No.Hei 9 (1997)-65101, filed on Mar. 18, 1997 whose priority is claimed under 35 USC §119, the disclosure of which is incorporated by reference in its entirety.

BACKGROUND OF THE INVENTION

1. Field of the Invention

The present invention relates to an ion-conductor for a lithium secondary battery and a lithium secondary battery using the same. More particularly, the invention relates to an ion-conductor, to which a specific additive is added, for a lithium metal secondary battery, a lithium alloy negative electrode secondary battery or a lithium ion secondary battery.

2. Related Art

In recent years, primary batteries using lithium as a negative electrode have been put in practical applications, attracting attentions because of their high voltage (3V to 4V) and high energy density. Lithium secondary batteries have also been receiving attentions, because the lithium secondary batteries are promising which will meet portability requirements for personal computers, word-processors, handy phones and the like.

Though the lithium secondary battery has come to spread rapidly in recent years, there is still a problem such that the battery cannot ensure a good charge-discharge efficiency and cycle lifetime. Therefore, there has been a longing for development of an ion-conductor which can provide a battery with improved cycle characteristics such as a charge-discharge efficiency and a cycle lifetime and with improved properties at a low temperature.

As the ion-conductor for a lithium secondary battery, an electrolytic solution form containing an electrolyte and an organic solvent and a solid electrolyte form are known.

As the organic solvent which is contained in the electrolytic solution, a solvent with low viscosity and a solvent with high dielectric constant are known. The charge-discharge efficiency of the battery obtained by using only a solvent with low viscosity is low, so that mixed solvents containing a solvent with low viscosity and a solvent with high dielectric constant are generally used.

As the mixed solvents, for example, conventionally known are a mixed solvent of propylene carbonate (PC) and 1,2-dimethoxyethane (DME), a mixed solvent of PC and benzene or toluene (Japanese Unexamined Patent Publication No. SHO 52 (1977)-109116), a mixed solvent of PC and tetrahydrofuran (Japanese Unexamined Patent Publication No. SHO 57 (1982)-118375), a mixed solvent of PC and dimethyl carbonate (DMC) or diethyl carbonate (DEC) (Japanese Unexamined Patent Publications No. HEI 2 (1990)-148665 and No. HEI 4 (1992)-171674) and the like. Also a mixed solvent of ethylene carbonate (EC) and dimethyl carbonate (DMC) or diethyl carbonate (DEC) (Japanese Unexamined Patent Publication No. SHO 59 (1984)-96666) is known.

As the solid electrolyte, polyethylene oxide (PEO) and the like are known.

In the case of a lithium metal secondary battery using lithium or an alloy thereof as a negative electrode active material, there has been a problem described below if an electrolytic solution containing an organic solvent is used.

That is, the organic solvent and the negative electrode active material react on a negative electrode side of the lithium metal secondary battery while on a positive electrode side thereof the electrolytic solution tends to be decomposed as a result of an electric potential kept at a high voltage. Therefore, there has been a problem such that the battery can not ensure good cycle characteristics.

In the case of a lithium ion secondary battery using a carbon material (e.g., graphite) as a negative electrode active material, there has been a problem as described below if an electrolytic solution containing an organic solvent composed of PC is used.

Namely, though it is preferable to use PC because PC is capable of keeping good low-temperature characteristics, the battery using PC can not ensure good cycle characteristics because PC tends to be decomposed during charging processes. Further, because there is a decomposed product inside the battery, there is a problem such that a danger of explosion or the like increases.

In order to solve this problem, EC can be used in place of PC. However, a melting point of EC is as low as 37 to 39° C., so that there arises another problem such as deterioration of cycle characteristics of a lithium ion secondary battery at low temperatures.

With respect to a solid electrolyte, a lithium secondary battery using the solid electrolyte has a disadvantage such as deterioration of cyclic characteristics because of low conductance thereof.

As mentioned above, the conventional ion-conductors for lithium secondary batteries are not stable enough for any application to the lithium metal secondary battery or the lithium ion secondary battery. Moreover, the conventional ion-conductors can not provide a lithium secondary battery with satisfactory cycle characteristics such as charge-discharge efficiency, cycle lifetime and the like.

SUMMARY OF THE INVENTION

The inventors of the present invention have found that cycle characteristics such as stability, cycle lifetime and the like of a lithium secondary battery can be improved by adding a specific additive to the ion-conductor for the lithium secondary battery using metallic lithium, graphite or the like as a negative electrode active material. Thus, the present invention has been achieved.

The present invention provides an ion-conductor for a lithium secondary battery comprising at least an electrolyte and an additive;

wherein the additive contains at least one kind of an imido compound selected from the group consisting of compounds of the general formula (I):

wherein Z is an optionally substituted alkylene group having 2 to 7 carbon atoms represented by the formula —$(CH_2)_n$— (n is an integer from 2 to 7), an optionally substituted 1,2-cyclohexylene group or an optionally substituted 1,2-phenylene group; and X is a hydrogen atom, an optionally substituted all group, an optionally substituted aralkylcarbonyl group, an optionally substituted alkylcarbonyl group, an optionally substituted alkoxycarbonyl group, an optionally substituted aralkyloxycarbonyl group or an optionally substituted imidyloxycarbonyl group.

The present invention further provides a lithium secondary battery comprising an ion-conductor for a lithium secondary battery as described above, a positive electrode and a negative electrode.

DETAILED DESCRIPTION OF THE PREFERRED EMBODIMENTS

In the definition of Z of the formula (I) representing the additive of the present invention, examples of optionally substituted alkylene groups having 2 to 7 carbon atoms represented by the formula —$(CH_2)_n$— (n is an integer from 2 to 7) include an alkylene group such as ethylene, trimethylene, tetramethylene, pentamethylene, hexamethylene and heptamethylene. Preferably, n is 2 or 3.

Moreover, Z may have a substituent. Examples of the substituents include a lower alkyl group, a lower alkoxy group and a residue capable of forming a cyclic imide together with an atom constituting Z.

Among these exemplary Z, ethylene, trimethylene, 1,2-cyclohexylene, 1,2-cyclopentylene and 1,2-phenylene are preferred. Ethylene and 1,2-phenylene are more preferred.

In the definition of X of the formula (I), the alyl group preferably has 1 to 20 carbon atoms. Specific examples thereof are a straight-chain alkyl group such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl and icosyl, and a branched-chain alkyl group such as isopropyl, methylpropyl, methylbutyl, methylpentyl, methylhexyl, methylheptyl, methyloctyl, methylnonyl, methyldecyl, methylundecyl, methydodecyl, methyltridecyl, methyltetradecyl, methylpentadecyl, methylhexadecyl, methylheptadecyl, methyloctadecyl and methylnonadecyl. Among them, the straight-chain or branched-chain alkyl groups having 1 to 6 carbon atoms are more preferred.

In the definition of X, examples of the aralkylcarbonyl groups include an alkylcarbonyl group whose alkyl moiety has 1 to 6 carbon atoms and is substituted by an aryl group such as phenyl, naphthyl or the like. Specific examples thereof are benzylcarbonyl, phenethylcarbonyl, phenylpropylcarbonyl, phenylbutylcarbonyl, phenylpentylcarbonyl and phenylhexylcarbonyl.

In the definition of X, the alkylcarbonyl group preferably has an alkyl moiety of 1 to 20 carbon atoms. Specific examples thereof are a straight-chain alkylcarbonyl group such as acetyl, propionyl, butyryl, pentanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl, icosanoyl and henicosanoyl and a branched-chain alkylcarbonyl group such as methylpropanoyl, methylbutanoyl, methylpentanoyl, methylhexanoyl, methylheptanoyl, methyloctanoyl, methylnonanoyl, methyldecanoyl, methylundecanoyl, methydodecanoyl, methyltridecanoyl, methyltetradecanoyl, methylpentadecanoyl, methylhexadecanoyl, methylheptadecanoyl, methyloctadecanoyl, methylnonadecanoyl and methylicosanoyl. Among them, the straight-chain or branched-chain alkylcarbonyl groups whose alkyl moiety has 1 to 6 carbon atoms are more preferred.

In the definition of X of the formula (I), the alkoxycarbonyl group preferably has an alkyl moiety of 1 to 20 carbon atoms. Specific examples thereof are a straight-chain alkoxycarbonyl group such as methoxycarbonyl, ethoxycarbonyl, propoxycarbonyl, butoxycarbonyl, pentyloxycarbonyl, hexyloxycarbonyl, heptyloxycarbonyl, octyloxycarbonyl, nonyloxycarbonyl, decyloxycarbonyl, undecyloxycarbonyl, dodecyloxycarbonyl, tridecyloxycarbonyl, tetradecyloxycarbonyl, pentadecyloxycarbonyl, hexadecyloxycarbonyl, heptadecyloxycarbonyl, octadecyloxycarbonyl, nonadecyloxycarbonyl and icosyloxycarbonyl and a branched-chain alkoxycarbonyl group such as methylpropoxycarbonyl, methylbutoxycarbonyl, methylpentyloxycarbonyl, methylhexyloxycarbonyl, methylheptyloxycarbonyl, methyloctyloxycarbonyl, methylnonyloxycarbonyl, methyidecyloxycarbonyl, methylundecyloxycarbonyl, methydodecyloxycarbonyl, methyltridecyloxycarbonyl, methyltetradecyloxycarbonyl, methylpentadecyloxycarbonyl, methylhexadecyloxycarbonyl, methylheptadecyloxycarbonyl, methyloctadecyloxycarbonyl and methylnonadecyloxycarbonyl. Among them, the straight-chain or branched-chain alkoxycarbonyl groups whose alkyl moiety has 1 to 6 carbon atoms are more preferred.

In the definition of X, examples of the aralkyloxycarbonyl groups include an alkoxylcarbonyl group whose alkyl moiety has 1 to 6 carbon atoms and is substituted by an aryl group such as phenyl, naphthyl, fluorenyl or the like. Specific examples thereof are benzyloxycarbonyl, phenethyloxycarbonyl, phenylpropyloxycarbonyl, phenylbutyloxycarbonyl, phenylpentyloxycarbonyl, phenylhexyloxycarbonyl and 9-fluorenylmethoxycarbonyl.

In the definition of X, examples of the imidyloxycarbonyl groups include succinimidyloxycarbonyl and phthalimidyloxycarbonyl.

More preferably, X is a hydrogen atom, an alkylcarbonyl group whose alkyl moiety has 1 to 6 carbon atoms, an alkoxycarbonyl group whose alkyl moiety has 1 to 6 carbon atoms, an aralkyloxycarbonyl group whose alkyl moiety has 1 to 6 carbon atoms and an imidyloxycarbonyl group.

In the definition of X, examples of the substituents include a lower alkyl group, a lower alkoxy group, succinimidyloxycarbonyloxy group and N-benzyloxycarbonylamino group.

Examples of especially preferable additive include an imido compound of the general formula (I):

(I)

wherein Z is ethylene (which becomes to form a succinimido-type compound) or 1,2-phenylene (which becomes to form a phthalimido-type compound); X is a hydrogen atom, an alkylcarbonyl group having 1 to 6 carbon atoms, an alkoxycarbonyl group whose alkyl moiety has 1 to 6 carbon atoms, an aralkyloxycarbonyl group whose alkyl moiety has 1 to 6 carbon atoms or succinimidyloxycarbonyl group;

an imido compound represented by the formula (II):

(II)

wherein $X^1$ is an optionally substituted alkylene group having 1 to 20 carbon atoms represented by the formula —$(CH_2)_n$— (n is an integer from 1 to 20), an optionally substituted 1,2-cyclohexylene or an optionally substituted 1,2-phenylene; or an imido compound represented by the formula (III):

(III)

wherein X is the same as defined above; $Z^2$ is phenyltetrayl, binaphthyltetrayl, isopropylidenediphenyltetrayl, hexafluoroisopropylidenediphenyltetrayl, diphenylethertetrayl, diphenylketonetetrayl or diphenylsulfonetetrayl.

More specific examples of the imido compound include, as represented by the formula shown below, N-hydroxyphthalimide (A), N-hydroxysuccinimide (B), N,N'-disuccinimidyl carbonate (C), 1,5-bis (succinimidyloxycarbonyloxy) pentane (D), N-(9-fluorenylmethoxycarbonyloxy)succinimide (E), N-(benzyloxycarbonyloxy) succinimide (F) and Z-glycine N-succinimidyl ester (G).

(A)

(B)

(C)

(D)

(E)

(F)

(G)

As an ion-conductor for a lithium secondary battery, an electrolytic solution form containing an electrolyte and an organic solvent and a solid electrolyte form are known.

As the electrolyte to be used in the present invention, any electrolyte known in the art such as lithium salt or the like may be used. Examples of the lithium salts include inorganic salts of lithium such as $LiPF_6$, $LiClO_4$, $LiAsF_6$, $LiBF_4$, $LiAlCl_4$, LiCl, LiBr and organic salts of lithium such as $CH_3SO_3Li$, $CF_3SO_3Li$, $LiB(C_6H_5)_4$, $CF_3COOLi$. These lithium salts may be used either alone or in a mixture.

In the case that the ion-conductor is provided in an electrolytic solution form, the additive and the electrolyte may be dissolved in an organic solvent.

As the organic solvent to be used in the present invention, any organic solvent known in the art may be used. Specific examples of the organic solvents include solvents with high dielectric constant selected from cyclic carbonates having 3 to 5 carbon atoms such as ethylene carbonate (EC), propylene carbonate (PC) and butylene carbonate (AC) and solvents with low viscosity selected from straight-chain alkyl carbonates having 3 to 9 carbon atoms such as dimethyl carbonate (DMC), diethyl carbonate (DEC), dipropyl carbonate (DPC) and ethyl methyl carbonate (EMC), straight-chain alkyl ethers such as 1,2-dimethoxyethane (DME), 1,2-diethoxyethane (DEE) and 1,2-dibutoxyethane (DBE), cyclic ethers such as tetrahydrofuran (THF) and 2-methyltetrahydrofuran, esters such as methyl formate, methyl acetate and methyl propionate and aromatic hydrocarbons such as benzene (Bz), toluene and xylene.

The solvent with high dielectric constant and the solvent with low viscosity may be used either alone or in a mixture thereof. However, in order to compensate for a low charge-discharge efficiency of the solvent with low viscosity, it is preferable to use a solvent with high dielectric constant in combination with the solvent with low viscosity. Examples of the combination of the solvent with low viscosity and the solvent with high dielectric constant include solvent systems of two components such as EC-DMC, EC-DEC, PC-DMC, PC-DEC and PC-EMC, solvent systems of three components such as EC-DMC-Bz, EC-DEC-Bz, PC-DMC-Bz, PC-DEC-Bz, EC-PC-DMC and EC-PC-DEC and solvent systems of four components such as EC-PC-DMC-Bz and EC-PC-DEC-Bz. A ratio by volume of the solvent with low viscosity and solvent with high dielectric constant is 1:4 to 2:1, preferably 1:2 to 1:1.

Alternatively, the ion-conductor may be produced in a solid electrolyte form. Examples of the solid electrolyte include polyacrylonitrile, polyvinylidene fluoride, a polymerized product of a photo-setting monomers including ethoxydiethylglycol acrylate and trimethylolpropane triacrylate, and polyphosphazene.

The amount of the additive to be blended is preferably 0.1% by weight to its saturation level, more preferably 0.2% to 5% by weight.

The additive of the present invention is considered to function in the ion-conductor as mentioned below.

Namely, it is considered that the additive has a strong coordination bonding force to a metal ion, so that molecules of the additive form coordination with a lithium ion more quickly and strongly than molecules of an organic solvent do. Therefore, the additive is considered to exist as a complex ion coordinated with lithium ions. Therefore, the additive may have a function of suppressing a reaction between the organic solvent and the negative electrode active material.

Further, the present invention provides a lithium secondary battery comprising an ion-conductor as described above, a positive electrode and a negative electrode.

The lithium secondary batteries are generally classified into a lithium metal secondary battery and a lithium ion secondary battery. The ion-conductor for the lithium secondary battery of the present invention can be used for both types of batteries.

A positive electrode of the lithium metal secondary battery is, for example, composed of a mixture of a positive electrode active material, a conductor and a binder.

Examples of the positive electrode active materials include polymer-conductors such as polyaniline, polyacetylene, poly-p-phenylene, polybenzene, polypyridine, polythiophene, polyfuran, polypyrrole, polyanthracene, polynaphthalene and a derivative thereof, inorganic conductors like metal oxides such as manganese dioxide, divanadium pentaoxide, molybdenum trioxide, chromium trioxide, cupric oxide and metal sulfides such as molybdenum disulfide, titanium disulfide, iron disulfide; and fluorinated hydrocarbons.

Specific examples of the conductors include acetylene black, graphite and carbon.

Examples of the binder include Teflon resin and ethylene-propylene-diene terpolymer.

Usable as a negative electrode of the lithium metal secondary battery is lithium or an alloy thereof. Exemplary lithium alloys include alloys of lithium with at least one metal selected from the group consisting of aluminum, magnesium, indium, mercury, zinc, cadmium, lead, bismuth, tin and antimony.

On the other hand, a positive electrode of the lithium ion secondary battery is, for example, composed of a mixture of a positive electrode active material, a conductor and a binder.

Examples of the positive electrode active materials include lithium complex metal oxides, for example, represented by the formula of $Li_p(MO_2)_q$ (M is at least one kind of a metal selected from the group consisting of cobalt, nickel and manganese; p and q are integers satisfying the demand for possible valences) and intercalation compounds including lithium such as $LiCoO_2$, $LiNiO_2$, $LiMnO_2$, $LiMn_2O_4$, $LiMn_3O_6$. The same kinds of the conductors and binders as mentioned above may be used.

A negative electrode of the lithium ion secondary battery is, for example, composed of a mixture of a negative electrode active material, a conductor and a binder.

As exemplary materials for the negative electrode active materials, carbon materials may be suitably used. Any kind of the carbon materials may be used as long as they are suitable for a lithium ion secondary battery. Specific examples of the carbon materials include graphite, and a carbon material obtained by calcining and carbonizing organic materials, e.g., conjugated-system resins such as phenolic resin, acrylic resin, polyimide and polyamide; condensed polycyclic hydrocarbon compounds such as naphthalene, phenanthrene and anthracene; furan resins such as a homopolymer of furfuryl alcohol or furfural and a copolymer thereof; and a product of petroleum pitch crosslinked with oxygen atoms. These carbon materials may be used either alone or in a mixture thereof. Among these carbon materials, graphite is preferred. The same kind of conductor and binder as mentioned above may be used.

For both of the lithium metal secondary battery and the lithium ion secondary battery, a separator may be provided between the positive electrode and the negative electrode to hold the ion-conductor and to prevent a short circuit therebetween. The material for the separator is not particularly limited as long as it is not soluble in the ion-conductor and is an insulating material which is easy to process. Specific examples of the materials for the separator include porous polypropylene and porous polyethylene.

Further, for both of the lithium metal secondary battery and the lithium ion secondary battery, the positive electrode and the negative electrode may be formed on a metal collector of aluminum, copper or the like.

The lithium secondary battery according to the present invention may be of a cylindrical shape, a square shape, a button shape, a sheet shape or the like.

EXAMPLES

The present invention will be further illustrated by the following examples.

Examples 1 to 3 and Comparative Example 1

Figure 1:
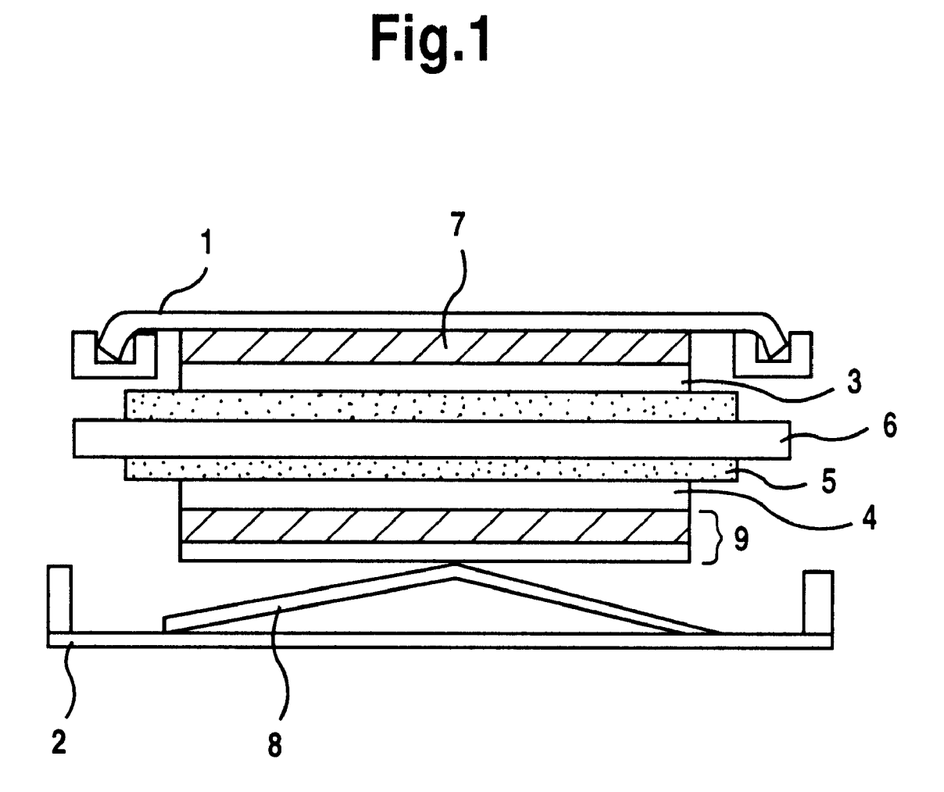
FIG. 1 is a schematic sectional view illustrating a construction of a coin-type cell used in Example of the present invention.

Ion-conductors for lithium secondary batteries of Examples 1 to 3 and Comparative Example 1 were evaluated by using coin-type cells shown in FIG. 1, and by determining the charge-discharge characteristics of the lithium secondary batteries under conditions as given below.

In a container (battery cans 1 and 2) of the coin-type cell, an LiPF$_6$/EC.DMC electrolytic solution containing 1 mol/liter of LiPF$_6$ (lithium hexafluorophosphate) as an electrolyte dissolved in an organic solvent mixture containing ethylene carbonate (EC) and dimethyl carbonate (DMC) in a ratio by volume of 1:2 was prepared as the electrolytic solution.

A positive electrode 3 containing a positive electrode active material, a negative electrode 4 of lithium, an electrolytic solution retainer 5 of a glass fiber paper and a separator 6 of polypropylene were provided in the container. A collector 7 of a stainless mesh was provided between the battery can 1 and the positive electrode 3. The negative electrode 4 was disposed on a collector 9, and a spring 8 was disposed between the collector 9 and the battery can 2. The negative electrode 4 of lithium had a thickness of 70 μm and a diameter of 15 mm φ. The positive electrode 3 contained 30 mg of LiCoO$_2$ as the positive electrode active material and had a diameter of 15 mmφ.

The charge-discharge test on the coin-type cell of the construction was performed under the following conditions. The coin-type cell was charged at 4.2V and discharged at 3.0V at a current density of 1.0 mA/cm$^2$ during a repeated charge-discharge process by applying a predetermined voltage between the positive electrode 3 and the negative electrode 4 in the electrolytic solution of LiPF$_6$/EC.DMC. The battery capacity of the coin-type cell was measured during the charge-discharge process, and the obtained measurements thereof were plotted in a graph.

1 mol/liter of the electrolytic solution of LiPF$_6$/EC.DMC was used as a standard solution. Ion-conductors containing various additives, for example, no additive (Comparative Example 1), 1% by weight of N-(benzyloxycarbonyloxy)succinimide (Example 1), 1% by weight of N-hydroxysuccinimide (Example 2), 1% by weight of N-hydroxyphthalimide (Example 3) were each charged in a coin-type cell, and evaluated by determining the cycle number and discharge capacity. The relationship between the cycle number and the discharge capacity is shown in FIG. 2.

Figure 2:
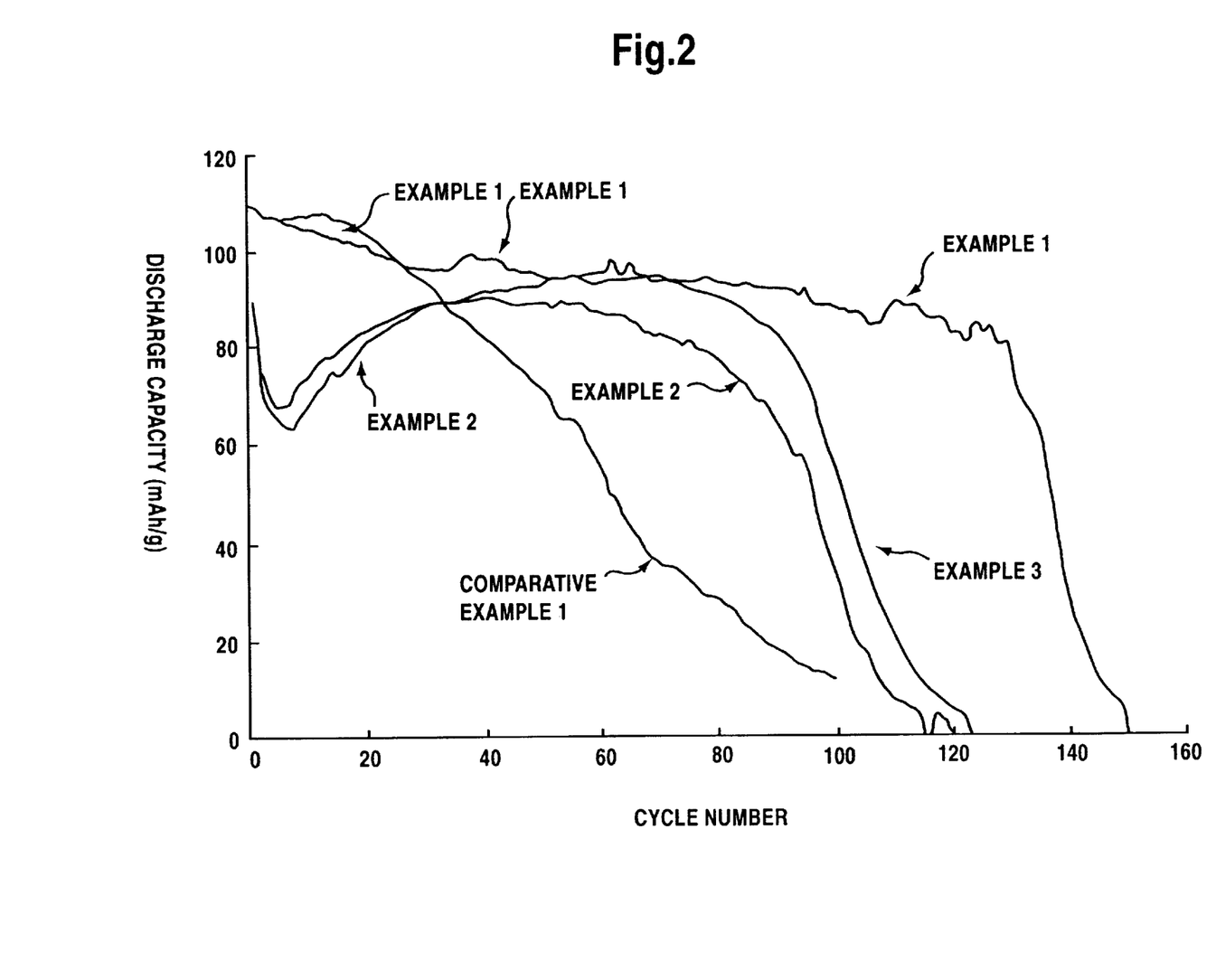
FIG. 2 is a graphical representation illustrating a relationship between the cycle number and the discharge capacity of the lithium secondary battery in Examples 1 to 3 and Comparative Example 1.

As is apparent from FIG. 2, the lithium secondary battery using the additive of the present invention has maintained a charge-discharge capacity over repeated charge-discharge processes as compared with the Comparative Example.

Example 4 and Comparative Examples 2 to 4

Ion-conductors were prepared in substantially the same manner as in Example 1, except that 1% by weight of N,N'-disuccinimidyl carbonate (Example 4), 1% by weight of succinimide (Comparative Example 2, a), 1% by weight of succinic anhydride (Comparative Example 3, b), or 1% by weight of N-bromosuccinimide (Comparative Example 4, c) was added to the standard solution. The ion-conductors were evaluated by performing the charge-discharge test in the same manner as in Example 1.

(a)

(b)

(c)

Figure 3:
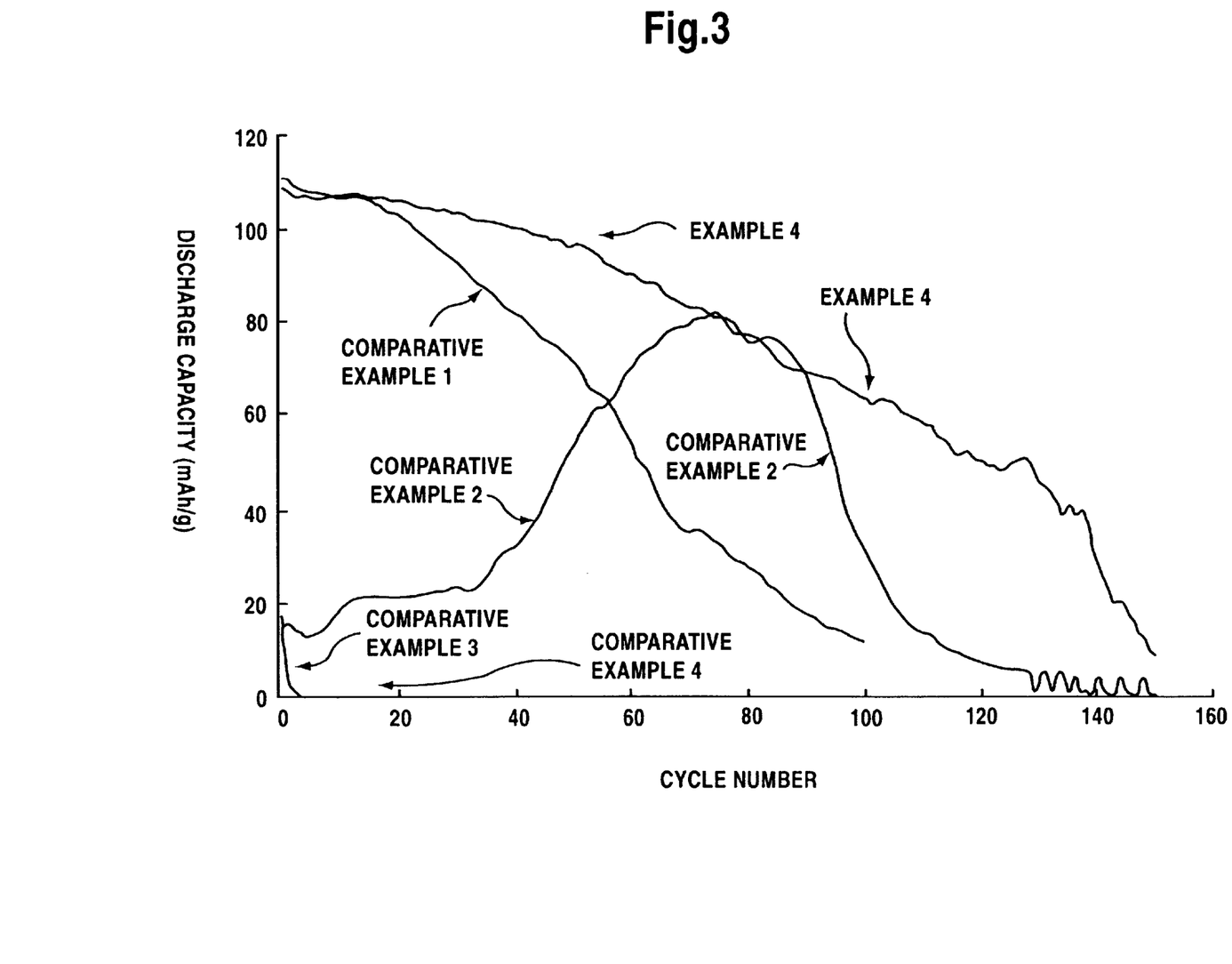
FIG. 3 is a graphical representation illustrating a relationship between the cycle number and the discharge capacity of the lithium secondary battery in Example 4 and Comparative Examples 1 to 4.

The relationship between the cycle number and the discharge capacity of Example 4 and Comparative Examples 2 to 4 is shown in FIG. 3 together with that of Comparative Example 1.

As is apparent from FIG. 3, the lithium secondary battery using the additive of the present invention has maintained a charge-discharge capacity over repeated charge-discharge processes as compared with the Comparative Example.

Example 5

Ion-conductor was prepared in substantially the same manner as in Example 1, except that 1% by weight of Z-glycine N-succinimidyl ester (Example 5) was added to the standard solution, LiMn$_3$O$_6$ of 3V class positive electrode material as a positive electrode active material was used and the battery was charged at 3.5V and discharged at 2.0V. The ion-conductor was evaluated by performing the charge-discharge test in the same manner as in Example 1.

Figure 4:
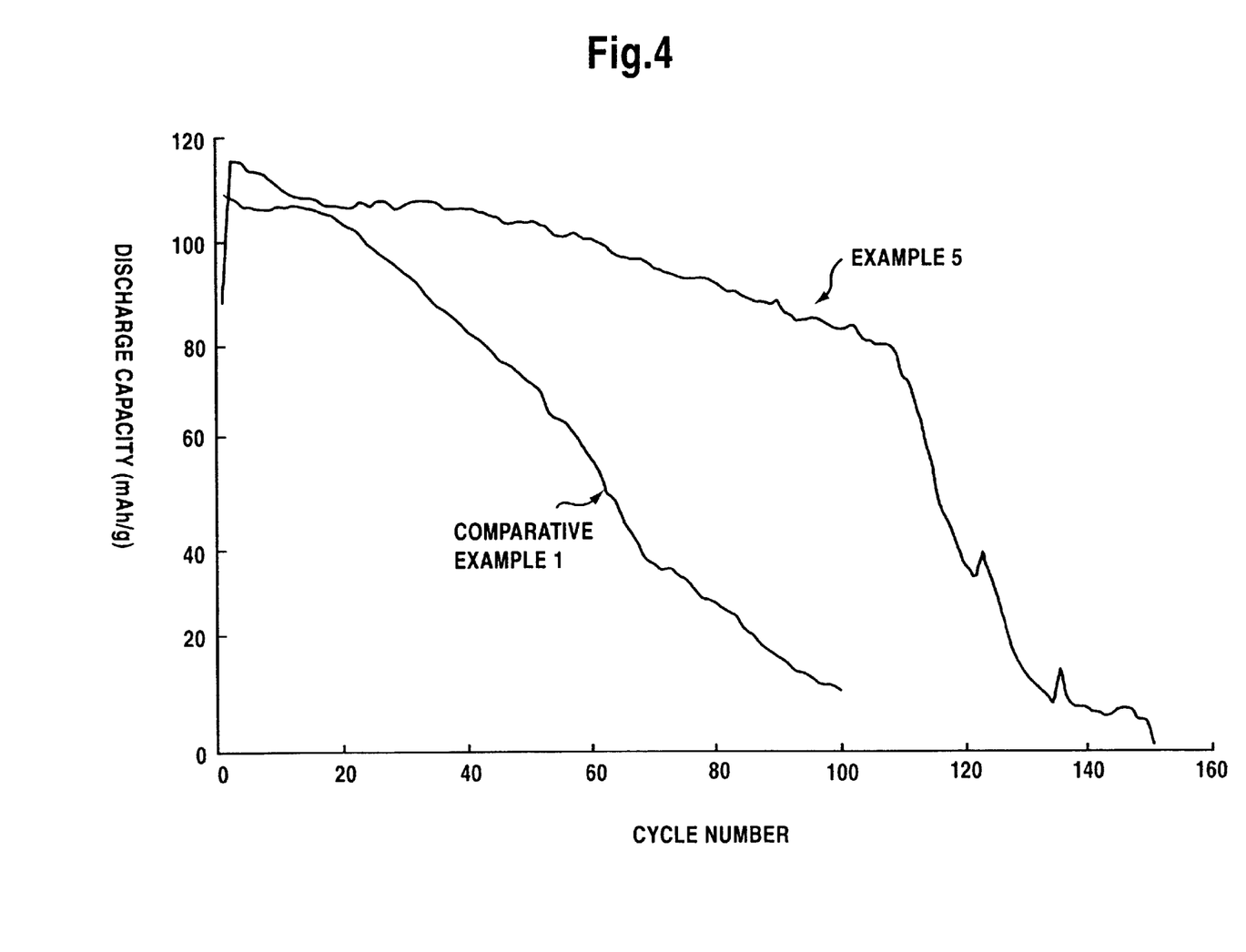
FIG. 4 is a graphical representation illustrating a relationship between the cycle number and the discharge capacity of the lithium secondary battery in Example 5 and Comparative Example 1.

The relationship between the cycle number and the discharge capacity of Example 5 is shown in FIG. 4 together with that of Comparative Example 1.

As is apparent from FIG. 4, the lithium secondary battery using the additive of the present invention has maintained a charge-discharge capacity over repeated charge-discharge processes as compared with the Comparative Example.

Examples 6 and 7 and Comparative Example 5

Ion-conductors were prepared in substantially the same manner as in Example 1, except that 1% by weight of N-(9-fluorenylmethoxycarbonyloxy)succinimide (Example 6) or 1% by weight of 1,5-bis(succinimidyloxycarbonyloxy) pentane (Example 7) was added to the standard solution. The ion-conductors were evaluated by performing the charge-discharge test in the same manner as in Example 1. At the same time, the ion-conductor with no additive (Comparative Example 5) was evaluated.

Figure 5:
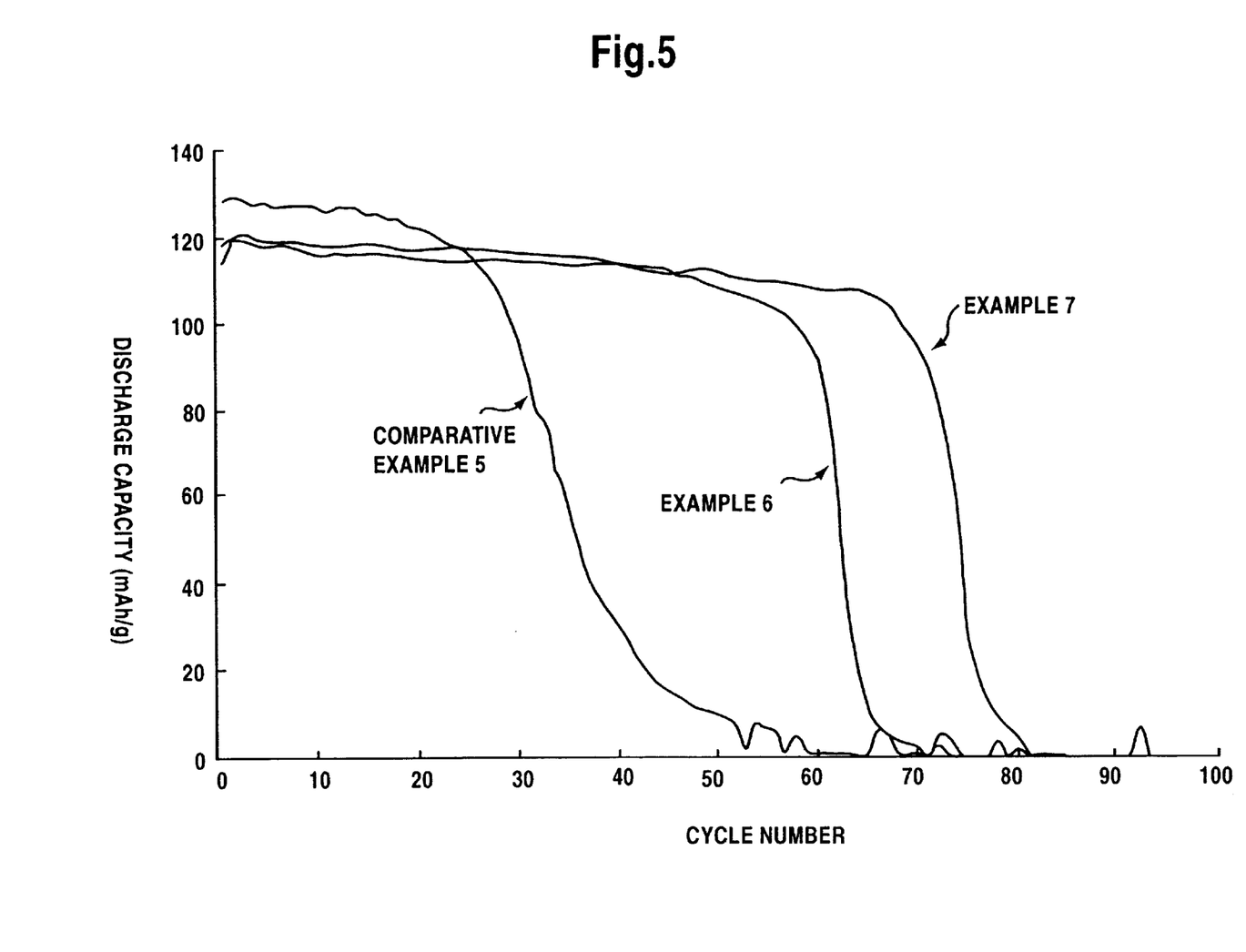
FIG. 5 is a graphical representation illustrating a relationship between the cycle number and the discharge capacity of the lithium secondary battery in Examples 6 and 7 and Comparative Example 5.

The relationship between the cycle number and the discharge capacity of Examples 6 and 7 and Comparative Example 5 is shown in FIG. 5.

As is apparent from FIG. 5, the lithium secondary battery using the additive of the present invention has maintained a charge-discharge capacity over repeated charge-discharge processes as compared with the Comparative Example.

Example 8 and Comparative Example 6

Ion-conductor was prepared in substantially the same manner as in Example 1, except that 1% by weight of N-(benzloxycarbonyloxy) succinimide (Example 8) was added to the standard solution. The ion-conductor was evaluated by performing the charge-discharge test in the same manner as in Example 1. At the same time, the ion-conductor with no additive (Comparative Example 6) was evaluated.

Figure 6:
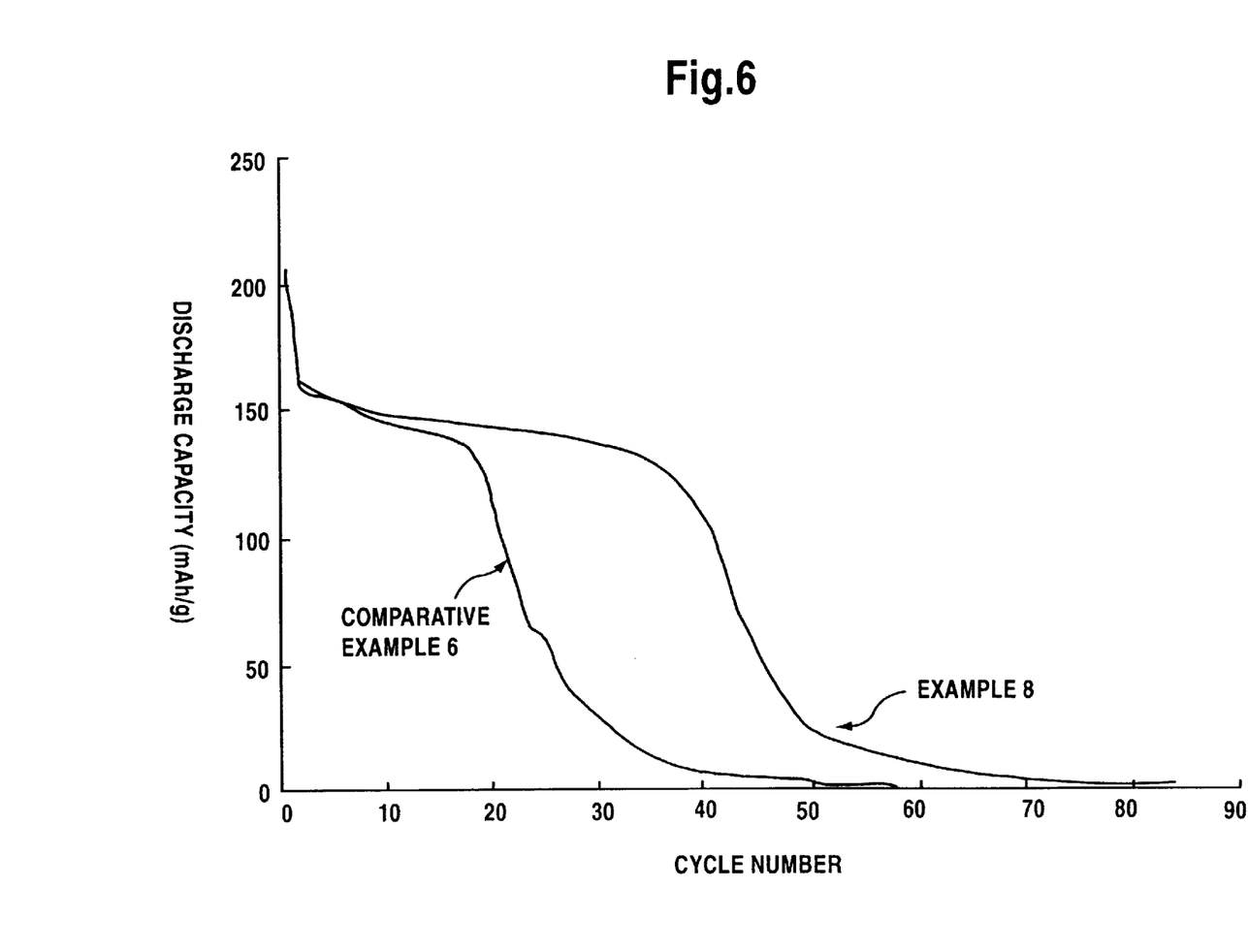
FIG. 6 is a graphical representation illustrating a relationship between the cycle number and the discharge capacity of the lithium secondary battery in Example 8 and Comparative Example 6.

The relationship between the cycle number and the discharge capacity of Example 8 and Comparative Example 6 is shown in FIG. 6.

As is apparent from FIG. 6, the lithium secondary battery using the additive of the present invention has maintained a charge-discharge capacity over repeated charge-discharge processes as compared with the Comparative Example.

Example 9

Ion-conductors were prepared in substantially the same manner as in Example 1, except that various amounts, i.e., 0%, 0.1%, 0.5%, 1.0%, 1.5%, 2.0% or 2.5% by weight of N-(benzyloxycarbonyloxy) succinimide was added to the standard solution. The cycle number of the ion-conductors were evaluated by performing the charge-discharge test in the same manner as in Example 1. The results are shown in Table 1.

The cycle number in Table 1 represents as the number at which the discharge capacity was reduced to 60% of the initial battery capacity.

TABLE 1

| Amount of additive (wt %) | Cycle number |
| --- | --- |
| 0 | 55 |
| 0.1 | 60 |
| 0.5 | 67 |
| 1.0 | 135 |
| 1.5 | 97 |
| 2.0 | 117 |
| 2.5 | 94 |

From Table 1, it is found that the amount of the additive according to the present invention is preferably 0.1% by weight or more.

Example 10

Ion-conductors were prepared in substantially the same manner as in Example 1, except that a mixed solvent of EC and DMC in a ratio by volume of 1:2 was used as an organic solvent and various amounts, i.e., 0%, 0.1%, 0.5%, 1.0%, 1.5% or 2.0% by weight of Z- glycine N-succinimidyl ester was added to the standard solution as an additive. The cycle number of the ion-conductors were evaluated by performing the charge-discharge test in the same manner as in Example 1. The results are shown in Table 2.

The cycle number in Table 2 represents the number at which the battery capacity was reduced to 60% of the initial battery capacity.

TABLE 2

| Amount of additive (wt %) | Cycle number |
| --- | --- |
| 0 | 34 |
| 0.1 | 40 |
| 0.5 | 56 |
| 1.0 | 96 |
| 1.5 | 86 |
| 2.0 | 78 |

From Table 2, it is found that the amount of the additive according to the present invention is preferably 0.1% by weight or more.

As shown above, the ion-conductor for a lithium secondary battery of the present invention comprises an electrolyte and an additive wherein the additive contains at least one kind of imido compound selected from the group consisting of compounds of the general formula (I):

(I)

wherein Z is an optionally substituted alkylene group having 2 to 7 carbon atoms represented by the formula $-(CH_2)_n-$ (n is an integer from 2 to 7), an optionally substituted 1,2-cyclohexylene group or an optionally substituted 1,2-phenylene group; and X is a hydrogen atom, an optionally substituted alkyl group, an optionally substituted aralkylcarbonyl group, an optionally substituted alkylcabonyl group, an optionally substituted alkoxycarbonyl group, an optionally substituted aralkyloxycarbonyl group or an optionally substituted imidyloxycarbonyl group.

Accordingly, the lithium secondary battery using the additive of the present invention has an increased cycle number for charge-discharge processes. Therefore, the charge-discharge characteristics of the lithium secondary battery are significantly improved. Further, a lithium secondary battery using the ion-conductor can ensure improved charge-discharge characteristics while retaining a high voltage and a high energy density.

What is claimed is:

1. An ion-conductor for a lithium secondary battery comprising at least an electrolyte and an additive;

wherein the additive contains at least one imido compound of the general formula (I):

(I)

wherein Z is an alkylene group having 2 to 7 carbon atoms represented by the formula $-(CH_2)_n-$ (n is an integer from 2 to 7) which may have substituent, a 1,2-cyclohexylene group which may have substituent or a 1,2-phenylene group which may have substituent; and X is a hydrogen atom or an aralkylcarbonyl group which may have substituent.

2. The ion-conductor for a lithium secondary battery of claim 1, wherein Z is ethylene or 1,2-phenylene group.

3. The ion-conductor for a lithium secondary battery of claim 1, wherein X is an alkylcarbonyl group.

4. The ion-conductor for a lithium secondary battery of claim 3, wherein X is benzyloxycarbonyl or N-(benzyloxycarbonyl)glycyl group.

5. The ion-conductor for a lithium secondary battery of claim 1, wherein the imido compound is at least one compound selected from the group consisting of N-hydroxyphthalimide, N-hydroxysuccinimide and Z-glycine N-succinimidyl ester.

6. The ion-conductor for a lithium secondary battery of claim 1, wherein the additive is added in an amount ranging from 0.1% by weight to its saturation level.

7. The ion-conductor for a lithium secondary battery of claim 1, wherein the ion-conductor is in an electrolytic solution form containing an electrolyte and an organic solvent or in a solid electrolyte form.

8. A lithium secondary battery comprising an ion-conductor for a lithium secondary battery according to claim 1, a positive electrode and a negative electrode.

9. An ion-conductor for a lithium secondary battery comprising at least an electrolyte and an additive;
wherein the additive contains at least one imido compound of the general formula (III):

(III)

wherein $Z^2$ is selected from the group consisting of phenyltetrayl, binaphthyltetrayl, isopropylidenediphenyltetrayl, hexafluoroisopropylidenediphenyltetrayl, diphenylethertetrayl, diphenylketonetetrayl and diphenylsulfonetetrayl; and X is a hydrogen atom, an alkyl group which may have substituent, an aralkylcarbonyl group which may have substituent, an alkylcarbonyl group which may have substituent, an alkoxycarbonyl group which may have substituent, an aralkyloxycarbonyl group which may have substituent or an imidyloxycarbonyl group which may have substituent.

10. The ion-conductor for a lithium secondary battery of claim 9, wherein Z is ethylene or 1,2-phenylene group.

11. The ion-conductor for a lithium secondary battery of claim 9, wherein X is an alkylcarbonyl, alkoxycarbonyl, aralkyloxycarbonyl or imidyloxycarbonyl group.

12. The ion-conductor for a lithium secondary battery of claim 11, wherein X is 9-fluorenylmethoxycarbonyl, benzyloxycarbonyl or N-(benzyloxycarbonyl)glycyl group.

13. The ion-conductor for a lithium secondary battery of claim 9, wherein the additive is added in an amount ranging from 0.1% by weight to its saturation level.

14. The ion-conductor for a lithium secondary battery of claim 9, wherein the ion-conductor is in an electrolytic solution form containing an electrolyte and an organic solvent or in a solid electrolyte form.

15. A lithium secondary battery comprising an ion-conductor for a lithium secondary battery according to claim 9, a positive electrode and a negative electrode.

* * * * *